United States Patent
Saputra

(10) Patent No.: US 10,683,243 B2
(45) Date of Patent: Jun. 16, 2020

(54) PROCESS FOR PRODUCING COAL-BASED FERTILIZER AND THE PRODUCTS PRODUCED

(71) Applicant: R. Umar Hasan Saputra, Jakarta (ID)

(72) Inventor: R. Umar Hasan Saputra, Jakarta (ID)

(73) Assignee: R. Umar Hasan Saputra, Jakarta (ID)

(*) Notice: Subject to any disclaimer, the term of this patent is extended or adjusted under 35 U.S.C. 154(b) by 134 days.

(21) Appl. No.: 15/418,516

(22) Filed: Jan. 27, 2017

(65) Prior Publication Data

US 2017/0233302 A1   Aug. 17, 2017

(51) Int. Cl.
| C05D 9/02 | (2006.01) |
| C05G 3/00 | (2020.01) |
| C05F 11/02 | (2006.01) |
| C05G 5/12 | (2020.01) |

(52) U.S. Cl.
CPC .............. *C05D 9/02* (2013.01); *C05F 11/02* (2013.01); *C05G 3/00* (2013.01); *C05G 5/12* (2020.02)

(58) Field of Classification Search
CPC .. C05D 9/02; C05F 11/02; C05G 3/00; C05G 3/0058
See application file for complete search history.

(56) References Cited

U.S. PATENT DOCUMENTS

| 2009/0209423 A1* | 8/2009 | Slabbekoorn | C05F 5/004 504/101 |
| 2013/0090236 A1* | 4/2013 | Smith | A01N 63/02 504/117 |
| 2017/0020132 A1* | 1/2017 | Erro Garces | A01N 43/16 |

FOREIGN PATENT DOCUMENTS

| CN | 101033153 A | * | 9/2007 |
| CN | 103553795 A | * | 2/2014 |

OTHER PUBLICATIONS

Halasova, G., et al. "Saccharides composition in amaranth grains." Bulletin Potravinarskeho Vyskumu (CSFR) (1992).*
Thailandunique. "Edible Silkwork Pupae—Bombyx Mori" <https://www.thailandunique.com/edible-silkworm-pupae> Jun. 7, 2014.*
Gunstone, A. F. "Typical Fatty-Acid Compositions of Some Common Fats. web. pdx. edu/~ wamserc." C336S12/fat. pdf (accessed Sep. 21, 2015).*

* cited by examiner

*Primary Examiner* — Jennifer A Smith
(74) *Attorney, Agent, or Firm* — North Weber & Baugh LLP

(57) ABSTRACT

This invention is connected with the products and the process of coal-based fertilizer, the process of which starts with coal crushing, filtering, mixing with other substances such as salt and essential nutrients maturing and forming the fertilizer into granules or prills (granulation). The processes of crushing and filtering will make the coal change into a simple form so that it can more easily be used by plants, while the granulation process will make this coal fertilizer easier to use when the application of fertilizing has to be done.

14 Claims, 3 Drawing Sheets

200

PROCESS FOR PRODUCING COAL-BASED FERTILIZER AND THE PRODUCTS PRODUCED

CROSS-REFERENCE TO RELATED APPLICATIONS

This application claims priority under 35 U.S.C. § 119, to Indonesian Application No. P00201600589, filed Jan. 28, 2016 entitled "PROCESS FOR PRODUCING COAL-BASED FERTILIZER AND THE PRODUCTS PRODUCED," the disclosure of which is incorporated by reference in its entirety.

BACKGROUND

Technical Field of the Invention

This invention relates to systems and methods for producing fertilizer and, in particular, coal-based fertilizer.

Description of the Related Art

Fertilizer can be used to aid in the growth and development of plants, for example, trees, vegetables, grass, turf, etc. Application of fertilizer to the soil can increase the growth and production of certain plants.

Fertilizers can be made from different types of materials that can be both organic and inorganic. However, one of the most effective fertilizer materials would be easy for the plants to absorb.

If a review of meeting the need for the nutrients is only based on the fit of the nutrients consumed with those needed, the best food for a living creature is the creature itself whose structure has been simplified so that it is easy to absorb. The best type of nutrients for living plants is a plant-based structure itself. As an example the best nutrient for fish is fish meal, because both the protein pattern and the fatty acids are relatively the same so that the fish will more easily make use of the nutrients from fish meal.

The same thinking is valid for plants, in that the best nutrients needed by plants comes from plants, the form of which has been simplified. An example often used for this thinking is compost, in that it is plants whose form has been simplified by microbial activity. Compost is very good and can be used by all types of plants. The best nutrients for plants are plants themselves.

Coal is a fossil fuel substance that originates from plants, which due to a physical process through pressure and temperature become stone. Even though it is in the form of stone, in its chemical structure it is a plant so that it contains the mineral materials needed by plants.

In its composition the biggest components in coal are carbon, in that its anthracite content is greater than 98%, and bituminous content between 68-86% (>80%). This composition is different for various types of coal, but whatever the type carbon is the greatest component, followed by oxygen and hydrogen. Besides carbon, oxygen and nitrogen coal has various mineral compounds which when studied are very much needed by plants, such as $SiO_3$, $A_2O_3$, $CaO$, $MgO$, $Na_2O$, $K_2O$, $Fe_2O_3$, $TiO_2$, $P_2O_5$ and $SO_3$. The complete contents of the minerals in coal are presented in Table 1.

TABLE 1

| Type and mineral chemical composition in coal | |
|---|---|
| Major Minerals | |
| Quartz | $SiO_2$ |
| Clay Minerals: | |
| Kaolinite | $Al_2Si_2O_5(OH)_4$ |
| Illite | $KAl_4(AlSi_7O_{20})(OH)_4$ |
| Chlorite | $(Mg,Al,Fe)_{12}[(Si,Al)_8O_{20}]_2(OH)_4 \cdot nH_2O$ |
| Pyrite | $FeS_2$ |
| Calcite | $CaCO_3$ |
| Siderite | $FeCO_3$ |
| Minor Minerals | |
| Analcime | $NaAlSi_2O_6 \cdot H_2O$ |
| Apatite | $Ca_5(PO_4)_3(OH,F,Cl)$ |
| Barite | $BaSO_4$ |
| Chalcopyrite | $CuFeS_2$ |
| Clausthalite | $PbSe$ |
| Crandallite group | |
| Crandallite | $CaAl_3(PO_4)_2(OH)_5 \cdot H_2O$ |
| Florencite | $CeAl_3(PO_4)_2(OH)_6$ |
| Gorceixite | $BaAl_3(PO_4)_2(OH)_5 \cdot H_2O$ |
| Goyazite | $SrAl_3(PO_4)_2(OH)_5 \cdot H_2O$ |
| Dolomite | $CaMg(CO_3)_2$ |
| Feldspars | $(Ca,K,Na)AlSi_3O_8$ |
| Galena | $PbS$ |
| Marcasite | $FeS_2$ |
| Monazite | $(Ce,I.a.Y.Th.Nd)PO_4$ |
| Rutile/anatase | $TiO_2$ |
| Sphalerite | $ZnS$ |
| Xenotime | $YPO_4$ |
| Zircon | $Zr(SiO_4)$ |
| Trace minerals | |
| Chromite | $FeCr_2O_4$ |
| Gibbsite | $Al(OH)_3$ |
| Gold | $Au$ |
| Gypsum | $CaSO4 \cdot 2H_2O$ |
| Halite | $NaCl$ |
| Magnetite | $Fe_3O_4$ |
| Muscovite | $KAl_2(AlSi_3O_{10})(OH)_2$ |

From table 1 coal contains various minerals that are clearly very much needed by plants so that they have the opportunity to be used as a plant fertilizer. The problem is that coal in its solid form cannot be used effectively by plants as a fertilizer since it cannot readily be absorbed by the plants.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, or a device.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components.

Furthermore, connections between components or systems within the figures are not intended to be limited to direct connections. Rather, data between these components may be modified, re-formatted, or otherwise changed by intermediary components. Also, additional or fewer connections may be used.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Furthermore, it shall be noted that: (1) certain steps may optionally be performed; (2) steps may not be limited to the specific order set forth herein; (3) certain steps may be performed in different orders; and (4) certain steps may be done concurrently.

Embodiments of the claimed invention are systems and methods to produce coal-based fertilizer. The coal-based fertilizer can be more effectively used by plants than other forms of fertilizer due to the chemical composition of the coal. However, the coal itself cannot function as a fertilizer without undergoing a process described herein.

In embodiments described herein, in order to make coal useful as a fertilizer it can be processed. The processing is described in reference to FIGS. 1 and 3.

Figure 1:
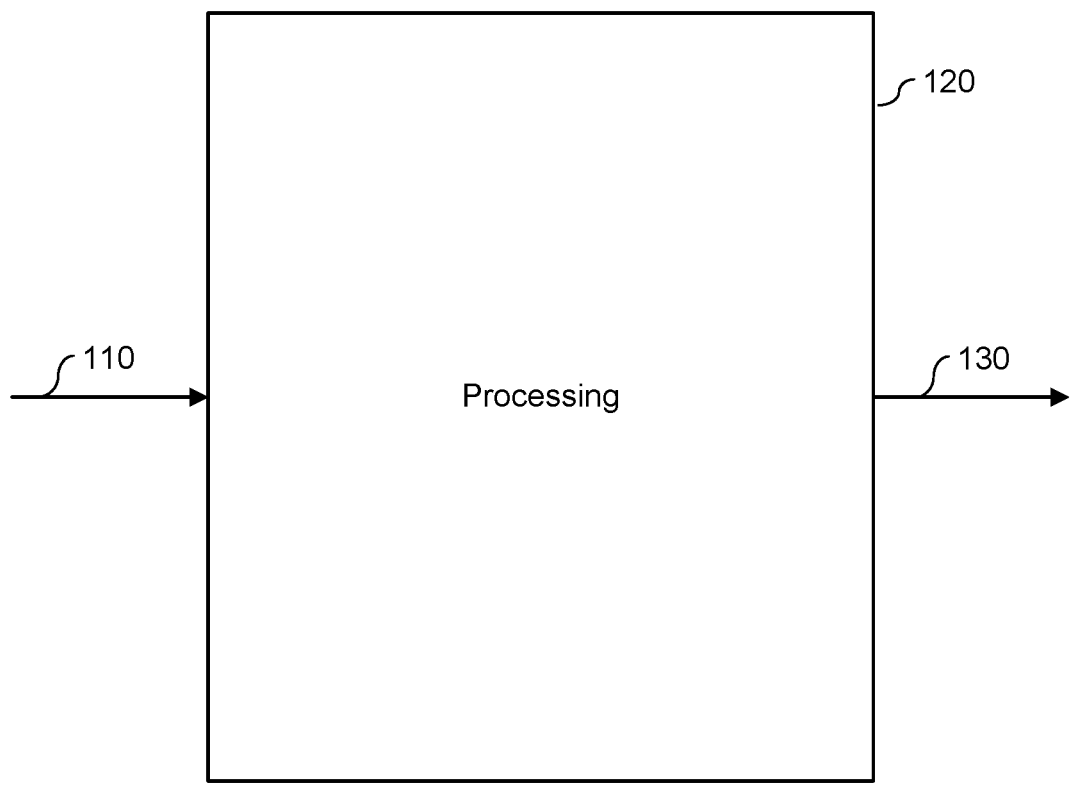
FIG. 1 depicts a block diagram fertilizer production system according to embodiments in this patent document.

FIG. 1 depicts a block diagram fertilizer production system according to embodiments in this patent document. FIG. 1 shows production system 100. In production system 100, raw coal 110 is input into processing 120 and the product that it is produced is fertilizer 130. Processing 120 is described further with respect to the FIG. 3. Processing 120 makes the solid form or raw coal useable as an effective fertilizer 130.

Figure 2:
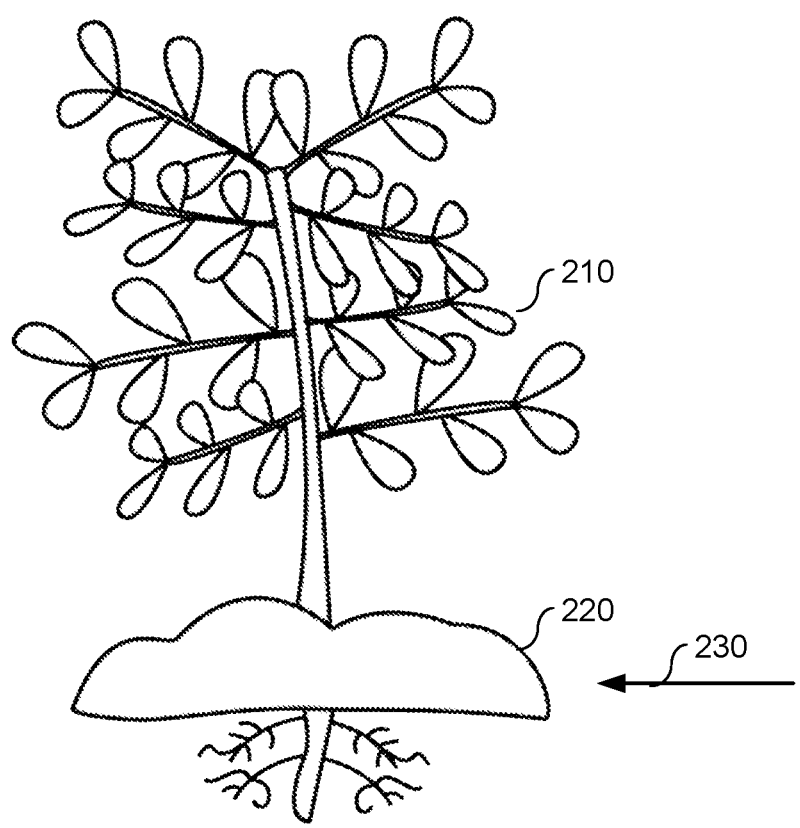
FIG. 2 depicts a block diagram fertilizer system according to embodiments in this patent document.

FIG. 2 depicts a block diagram fertilizer system according to embodiments in this patent document. Fertilizer system 200 is shown in FIG. 2. Fertilizer system 200 shows a plant 210 being planted in soil 220. Fertilizer 230 can be applied to soil 220. Once fertilizer 230 is applied to soil 220, plant 210 can grow more effectively. Fertilizer 230 can be used on crops used for food, on crops used for other products, on trees, or other agricultural systems.

The more effective the fertilizer 230 is the better the growth of the plant 210. In crops, that effectiveness can translate to more profits or more growth more quickly. It is advantageous to have the most efficient fertilizer possible.

As described above, the most effective fertilizer for plants is one that shares common elements with plants themselves. As described above, coal shares many common elements with plants and therefore can provide the most effective nutrients to the plants.

However, coal in its raw solid form cannot be added to the soil 220 in a useful way. Therefore, in order to turn coal into fertilizer, the coal can be processed.

Figure 3:
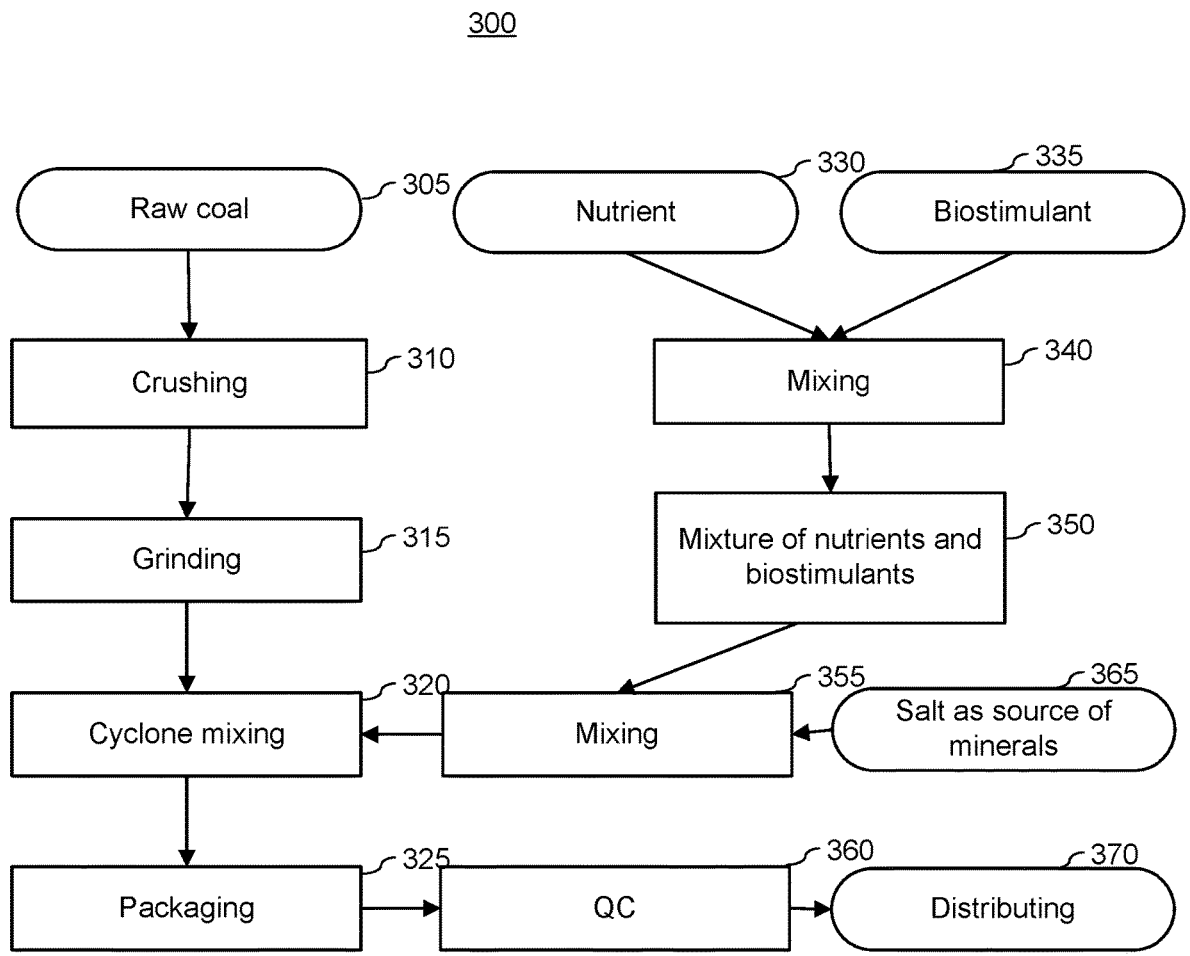
FIG. 3 depicts a flowchart fertilizer production method according to embodiments in this patent document.

FIG. 3 depicts a flowchart fertilizer production method according to embodiments in this patent document. FIG. 3 shows starting with raw coal 305, nutrients 330, and biostimulants 335.

In embodiments, the coal is crushed 310. In embodiments, the crushed coal is then ground 315. The crushed ground coal can be then cyclone mixed 320. The nutrients 330 and biostimulants 335 can be mixed 340 to make mixture of nutrients and biostimulants 335. The mixture 350 can be mixed with salt 365 and added to the cyclone mix 320. The resulting product can be packaged 325 and quality controlled 360 for distributing 370.

In embodiments, the process itself starts with crushing 310 the coal using a coal crusher. It can be ground 315 until a fine coal size is reached (fine coal-3 mm or 0.12 inches). This fine coal can be mixed with salt 365 whose function is as a carrier of the minerals in coal to enter into the plant cells.

In embodiments, in addition to salt 365 the fertilizer product produced in this patent nutrients 330 and 335 are also inserted so that the fertilizer produced is a complete fertilizer so that it is expected to have a positive effect for plant production.

Even though the chemical composition of the substances and minerals in the coal are very beneficial for plants, plants might not be able to use the substances or minerals if they are given in the form of coal lumps. Its form can be simplified, and this simplification can be done by microbes since it is already in the form of stone.

The initial simplification process is done by crushing or grinding the coal using a coal crusher and then it is filtered. After this filtering, in general we will get a type of coal resulting from the grinding 315, that is coarse coal (>25 mm~1 inches), small coal (25-3 mm), fine coal (<3 mm~0.12 inches) and ultra fine coal<0.15 mm~0.006 inches).

In embodiments, as fertilizer raw material, the finer (fine) the size of the coal the better it will be used for fertilizer. The size that still can be used for this purpose is a little over 3 mm and below in accordance with the capacity of the filtering that can be done. The sizes of the coal particles that have been filtered in various mesh sizes are specified in Table 2.

Then in processing it, the coal that has been filtered is mixed with salt 365 at a minimum level of 0.1%. The purpose of this mixing is to provide a mineral or a carrier element for the minerals in the coal. These carriers are very important, since if they aren't present it will be difficult or very few of the minerals can be used by the plant.

TABLE 2

The size of the filtered particles in various filter sizes (meshes)

| US Standard | | | WS Tyler | | |
|---|---|---|---|---|---|
| Mesh | Inch | Millimeter | Mesh | Inch | Millimeter |
| 20 | 0.033 | 0.84 | 20 | 0.033 | 0.83 |
| 30 | 0.023 | 0.59 | 28 | 0.023 | 0.59 |
| 40 | 0.0165 | 0.42 | 35 | 0.016 | 0.42 |
| 50 | 0.0117 | 0.30 | 48 | 0.0116 | 0.30 |
| 60 | 0.0098 | 0.25 | 60 | 0.0097 | 0.25 |
| 100 | 0.0058 | 0.149 | 100 | 0.0058 | 0.15 |
| 140 | 0.0041 | 0.105 | 150 | 0.0041 | 0.10 |
| 200 | 0.0029 | 0.074 | 200 | 0.0029 | 0.074 |
| 325 | 0.0017 | 0.044 | 325 | 0.0017 | 0.043 |

The purpose of this mixing is so that the fertilizer produced is fertilizer with complete nutrition contents, both seen from the content of the nutrients for the plants and from the content of the essential nutrition to accelerate the physiological processes in plants. The essential nutrition provided consists of types of monosaccharides (fructose and glucose), oligosaccharides (FOS and GOS), polysaccharides (starch), amino acids, fatty acids and vitamins. Table 3 shows the types of essential nutrition mixed in the coal fertilizer resulting from the filtering and the addition of the above salts. Overall the percentage of the essential nutrition added is a minimum of 0.01% of the coal fertilizer by weight.

One of the other advantages of providing this essential nutrition is that some of them (such as prebiotics) are sources of energy for bacteria for the activity of breaking it down so that noting that the size of the coal is very small (fine) the breaking down can occur in the coal and so it can make more effective use of the fertilizer itself.

TABLE 3

Essential nutrition content inserted into the coal fertilizer

| No | Analysis Type | Content | Unit |
|---|---|---|---|
| | Proximate | | |
| 1. | Water Content | 14.95 | % |
| 2. | Ash Content | 3.49 | % |
| 3. | Total Protein | 47.98 | % |
| 4. | Total Fat | 1.25 | % |
| 5. | Carbohydrate | 31.37 | % |
| | Fatty Acids | | |
| 6. | Caprylic Acid (C8:0) | 0.881 | (g/100 g fat) |
| 7. | Capric Acid (C10:0) | 1.924 | (g/100 g fat) |
| 8. | Lauric Acid (C12:0) | 10.798 | (g/100 g fat) |
| 9. | Myristic Acid (C14:0) | 1.711 | (g/100 g fat) |
| 10. | Palmitic Acid (C16:0) | 17.628 | (g/100 g fat) |
| 11. | Stearic Acid (C18:0) | 1.799 | (g/100 g fat) |
| 12. | Oleic Acid (C18:1) | 29.865 | (g/100 g fat) |
| 13. | Linoleic Acid (C18:2) | 7.225 | (g/100 g fat) |
| 14. | Linolenic Acid (C18:3) | 19.667 | (g/100 g fat) |
| | Amino Acids | | |
| 15. | Aspartic Acid | 2.018 | % |
| 16. | Glutamic Acid | 2.519 | % |
| 17. | Serine | 0.299 | % |
| 18. | Arginine | 0.552 | % |
| 19. | Threonine | 6.322 | % |
| 20. | Alanine | 0.947 | % |
| 21. | Proline | 0.685 | % |
| 22. | Tyrosine | 0.332 | % |
| 23. | Valine | 0.419 | % |
| 24. | Methionine | 0.835 | % |
| 25. | Isoleucine | 2.036 | % |
| 26. | Leucine | 1.416 | % |
| 27. | Phenylalanine | 0.351 | % |
| 28. | Lysin | 15.874 | % |
| | Prebiotics | | |
| 29. | Fructooligosaccharide (FOS) | 3.448 | g/100 g |
| 30. | Galactooligosaccharide (GOS) | 1.108 | g/100 g |
| | Vitamins | | |
| 31. | Vitamin A | 32.65 | mcg/100 g |
| 32. | Vitamin C | 102.24 | mcg/100 g |
| 33. | Vitamin E | 5.78 | mcg/100 g |
| 34. | Vitamin B1 | 3.09 | mcg/100 g |
| 35. | Vitamin B2 | 2.26 | mcg/100 g |

The coal fertilizer produced from the last process above is still in powder form so that in the process of applying it, it will not be liked by users especially if it is spread by themselves. That is why the next process is the granulation in the coal fertilizer resulting from the above mixings. This process will make the fertilizer that was in powder form into granular form such as in the form of urea prills (bulk) or NPK fertilizer. When it is in the form of prills or granules it will be easier to use by users either by spreading it itself or mixed with other fertilizer.

The next process is the packaging 325 process. It differs from ordinary chemical fertilizers that consist of only 1 plastic sack. Packaging the coal fertilizer consists of double packing, that is an inside and an outside package. The inside packing is a plastic bag (polyethylene) while the outside packing is a plastic sack. The purpose of this double packing is so that the quality of the fertilizer is better guarded and it reduces possible excess oxidation resulting from air entering from the plastic sack. Another advantage of this method is if the sack is immersed in water, the condition of the fertilizer is still safe while the inside packing does not leak.

One of ordinary skill in the art will appreciate that various benefits are available as a result of the present invention.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

The invention claimed is:

1. A coal-based fertilizer product comprising: a raw coal product that has been crushed and ground;
a salt product that has been mixed with the raw coal product; and
an essential nutrition product present in the coal-based fertilizer in an amount at a minimum of 0.01% (w/w) essential nutrition product based on the total weight of the coal-based fertilizer product,
wherein the essential nutrition product comprises:
one or more amino acids in an amount ranging from 0.299-34.605% based on the total weight of the essential nutrition product;

one or more fatty acids selected from the group consisting of caprylic acid, capric acid, lauric acid, myristic acid, palmitic acid, stearic acid, oleic acid, linoleic acid, linolenic acid, and combinations thereof;

one or more vitamins in an amount ranging from 2.26-146.02 mcg/100g essential nutrition product; and one or more oligosaccha rides selected from the group consisting of fructoligosaccharides, galactooligosaccharides, and combinations thereof as energy sources for bacteria that aid in processing the coal-based fertilizer.

2. The fertilizer product according to claim 1, wherein the fertilizer product has been shaped into granule or prill form, crumbs, or powder form.

3. The fertilizer product according to claim 1, wherein the fertilizer comprises one or more organic products.

4. The fertilizer product according to claim 1, further comprising one or more monosaccharides as a mixing substance.

5. The fertilizer product according to claim 4, wherein the one or more monosaccharides comprise fructose and glucose as mixing substances.

6. The fertilizer product according to claim 1, further comprising one or more polysaccha rides as a mixing substance.

7. The fertilizer product according to claim 6, wherein the one or more polysaccharides comprise starch.

8. The fertilizer product according to claim 1, wherein the one or more amino acids comprise one or more of glutamic acid, methionine, or proline as a mixing substance.

9. The fertilizer product according to claim 1, wherein the one or more amino acids comprise glutamic acid and methionine as a mixing substance.

10. The fertilizer product according to claim 1, wherein the one or more fatty acids comprise one or more of palmitic acid, oleic acid, or linoleic acid as mixing substances.

11. The fertilizer product according to claim 1, wherein the one or more fatty acids comprise palmitic acid and oleic acid as mixing substances.

12. The fertilizer product according to claim 1, where the one or more vitamins comprise vitamin C and vitamin B1.

13. The fertilizer product according to claim 1, wherein the raw coal product has been mixed with at least one of a nutrient or a biostimulant.

14. The fertilizer product according to claim 13, wherein the raw coal product has been mixed with at least one non-nutrient product.

* * * * *